United States Patent [19]
Snider

[11] Patent Number: 5,991,893
[45] Date of Patent: Nov. 23, 1999

[54] VIRTUALLY RELIABLE SHARED MEMORY

[75] Inventor: Gregory S. Snider, Mountain View, Calif.

[73] Assignee: Hewlett-Packard Company, Palo Alto, Calif.

[21] Appl. No.: 08/921,275

[22] Filed: Aug. 29, 1997

[51] Int. Cl.[6] ..................................................... G06F 12/14
[52] U.S. Cl. .................. 714/4; 714/11; 714/12; 714/15
[58] Field of Search .......................... 395/182.02, 182.09, 395/182.1, 182.13, 200.43, 200.44, 200.46, 200.51; 711/147, 148, 152; 714/4, 11, 12, 15; 709/213, 214, 216, 221

[56] References Cited

U.S. PATENT DOCUMENTS

| | | | |
|---|---|---|---|
| 4,564,900 | 1/1986 | Smitt .................................. | 395/200.42 |
| 4,965,717 | 10/1990 | Cutts, Jr. et al. .................... | 395/182.1 |
| 5,388,215 | 2/1995 | Baker et al. ......................... | 395/200.59 |
| 5,487,148 | 1/1996 | Komori et al. ...................... | 395/182.02 |
| 5,668,943 | 9/1997 | Attanasio et al. ................... | 395/182.05 |
| 5,790,776 | 8/1998 | Sonnier et al. ..................... | 385/182.08 |
| 5,805,785 | 9/1998 | Dias et al. .......................... | 395/182.02 |
| 5,812,748 | 9/1998 | Ohran et al. ........................ | 395/182.02 |
| 5,819,019 | 10/1998 | Nelson ................................ | 395/182.02 |
| 5,838,894 | 11/1998 | Horst .................................. | 395/182.09 |
| 5,845,071 | 12/1998 | Patrick et al. ...................... | 395/200.45 |

OTHER PUBLICATIONS

John Chapin, Mendel Rosenblum, Scott Devine, Tirhankar Lahiri, Dan Teodosiu, Anoop Gupta; "Hive: Fault Containment for Shared–Memory Multiprocessors," Association for Computing Machinery, Inc.; 1995; pp. 1–15.

Yousef A. Khalidi, Jose M. Bernabeu, Vlada Matena, Ken Shirriff, Moti Thadani; "Solaris MC: A Multi Computer OS;" Sun Microsystems Laboratories Jan. 1996; pp. 1–13.

*Primary Examiner*—Robert W. Beausoliel, Jr.
*Assistant Examiner*—Wasseem Hamdan

[57] ABSTRACT

The inventive computer system uses a layer of software between the operating system and the hardware that localizes the fail-safe protocols into a single module. The system also uses shared memory allocation functions as the interface with the operating system. The memory allocation function creates data structures to satisfy the requests of the operating system. The system also has a data structure locking mechanism to prevent more than one processor from writing to the data structure at a time. This layer isolates and hides the complexities of the underlying hardware and memory sharing, and presents a simpler view of the hardware as a single system to the operating system that resides above it. Since all of the fail-safe code is in one single module, rather than distributed throughout the operating system, it is easier to test and verify its correct operation, as well as maintain the operating system.

33 Claims, 1 Drawing Sheet

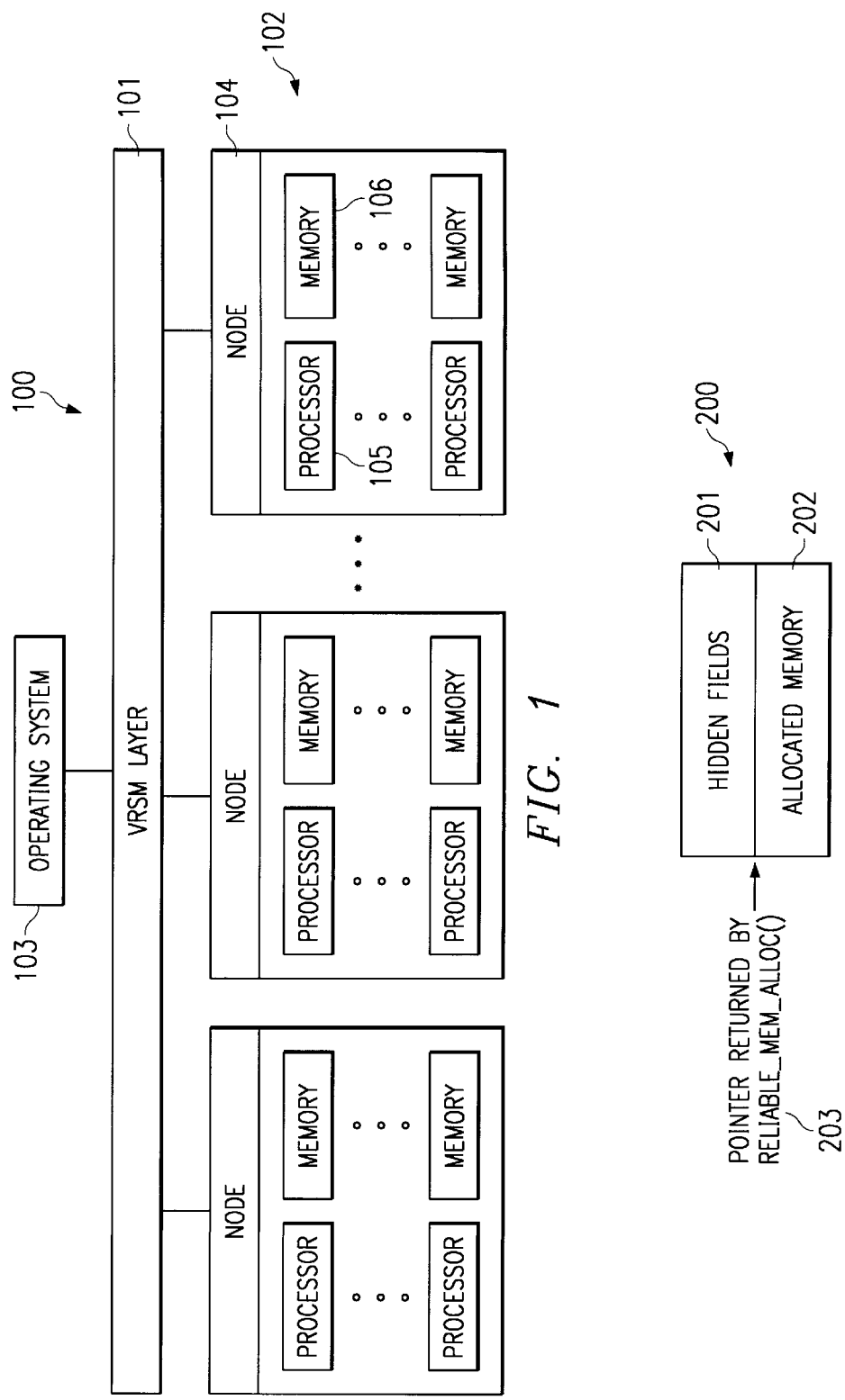

VIRTUALLY RELIABLE SHARED MEMORY

TECHNICAL FIELD OF THE INVENTION

This application relates in general to large scale computer systems with a large number of processors, and in specific to a software interface layer that provides the appearance of a virtual machine to the structures above the layer.

BACKGROUND OF THE INVENTION

Over the past few years computer systems have become larger and larger, with more processors, more interconnections, and more physical memory being incorporated therein. The increasing size of the computer systems has led to a reliability problem that greatly affects system operation.

This problem has two significant factors, the first is hardware unreliability and the second is software unreliability. Regarding the hardware aspects of the problem, the probability that any one piece of hardware will fail in the system, increases as the number of pieces of hardware in the system increases. This is due to the large size of the system, as well as the increasing complexity of hardware.

Regarding the software aspects of the problem, the software has become unreliable and tends to fail unexpectedly. This is because the systems are becoming faster, and the programs are becoming larger and more complex, which leads to an increase in the occurrence of software failures. The higher clock rates of the systems allow the software to run faster. Since more lines of code are being run in a given period of time, then the system is more likely to execute buggy code, thus causing the system to fail simply because it is running faster. Moreover, since the systems are running faster and have more memory, programs have become larger and more complex, thus increasing the likelihood that buggy code exists in the programs. For example, assume a certain defect rate of one bug in every 10,000 lines of code. Thus a 100,000 line program would have 10 bugs, while a 30,000 line program would have only 3 bugs. Furthermore, because the code is running more quickly, the system is more likely to run across those bugs. Thus, the problems of hardware unreliability and software unreliability are two obstacles in building large systems.

A prior approach to solving this problem is to divide up a large system into domains or nodes. The concept, known as clustering, contains failures in the system, such that if there is a failure, either hardware or software, in one node or domain of the system, the damage that is done is limited to the domain in which the fault occurs. For example, if there is a large system that is divided into ten domains, and an error occurs in one of domains of such severity that it brings down that domain, then the remaining nine domains would continue to operate. A domain could have a single processor or many processors.

A domain is a subset of the hardware that is isolated from the remainder of the system with some fail-safe mechanisms that prevent failures within a failed domain from spreading into the other domains and crashing the entire system. A domain oriented system uses software partitioning mechanisms such that the software is aware of the domains and uses certain protocols to contain software faults to within a domain. These software mechanisms are complex and expensive to implement, and invasive in the sense that they require changes to many parts of the operating system, and require that operating system engineers be cognizant of the unreliability of the underlying hardware.

Traditional clusters use message-based communications between the domains or nodes, and thus require software to ensure reliable communications over potentially unreliable links (e.g. transmission control protocol/internet protocol or TCP/IP), and to maintain some degree of coherence between the software resources on different nodes (e.g. network file system or NFS).

The clustering approach provides good isolation between the domains or nodes, and therefore good overall system availability. However, this approach has the disadvantages of increased costs from complexity, lower performance (since applications using resources spanning several nodes must compete with the hardware and software overheads of internode communications), and a lack of a single system image.

Another approach is to modify the clusters for memory sharing among the nodes. This moves the cluster software mechanisms for resource coherence and communication down into the cache-coherence hardware, and thus exploits the existing hardware capabilities more fully, while simplifying the software and improving performance. However, this reintroduces the problems of poor reliability from hardware and software failures, discussed earlier.

There are several approaches to resolving the above problems. One way is to have a very reliable system, and endure the performance sacrifices. This approach divides the system into independent subsets of processors and memories, and treats each of the subsets as though they were separate systems. This approach, taken by Sun in its initial offering of Ultra Enterprise 10000 multiprocessor (64 CPUs), allows existing cluster software solutions to be used, but fails to capitalize on the potential of the shared memory. Moreover, this approach does not present a single system image, as by definition, the large system has been separated into smaller, independent systems. This approach also makes system maintenance, such as granting user accounts, privileges to the different users, maintaining file systems, system accounting, maintaining applications, and updating applications, extremely difficult. Each subset would have to be individually maintained.

Another approach is exemplified by the Solaris MC system, as detailed in the paper entitled "Solaris MC: A Multi-Computer OS" by Khalidi et al. of Sun Microsystems Laboratories, Technical report SMLI TR-95-48, November, 1995. In this approach, the system is partitioned into subsets and relies on traditional message-based communication between the subsets, using shared memory as the transport mechanism rather than a network. This approach has the advantage of being able to use existing cluster-based operating system code with improved performance, since the shared memory provides better performance than the network transport. However, this approach fails to exploit the potential for sharing memory objects between subsets. Solaris MC mitigates this weakness somewhat with the "bulkio no-copy" protocol, which allows for somewhat more efficient performance, but still requires explicit use of such mechanisms as the PXFS coherency protocol which introduces more complexity.

Solaris operates in a similar manner to the traditional clustered approach where the software domains are very loosely coupled and use messaging exclusively for communication between the nodes or domains. Since the operating system itself does not really share memory between the domains, Solaris overcomes the reliability problem by simply not allowing sharing of memory between domains. However, this approach does not overcome the other problems of limited system performance and the lack of a single system image. Essentially, Solaris uses messaging to gain high system reliability, and modestly increases system performance by using shared memory as the transport mechanism to carry the messages between the nodes, as compared with a network transport mechanism. This approach also suffers some of the maintenance problems as the Sun Ultra Enterprise system, as discussed above.

Another approach is exemplified by the Hive system, as detailed in the paper entitled "Hive: Fault Containment for Shared-Memory Multiprocessors", by Chapin et al., Stanford University, http://www-flash.stanford.edu. The Hive operating system exposes more of the coherent shared memory to the operating system and applications, but requires a set of protocols to overcome the unreliability of the system. These software protocols segment the domains and contain software and hardware faults, and thus compensate for the unreliability of the underlying hardware and software. These protocols include nontransparent proxies, which are proxies that the operating system programmer must be aware are being used.

Essentially, the Hive uses shared memory between the different domains or nodes, and imposes the set of protocols to prevent the system from crashing if a failure occurs in one part of the shared memory, one processor in another domain, or software in another domain. Thus, the Hive system has good reliability because of the protocols, and good performance characteristics because it uses shared memory.

However, Hive has a problem in that the protocols introduce a high level of complexity into the operating system. These mechanisms are distributed throughout the kernel or core of the operating system, consequently requiring kernel programmers to be aware of the hardware fault mechanisms, as well as which data structures are sharable and which protocol is necessary to share them. For example, RPC is difficult when the call involves locking resources in the remote node at interrupt level. Distributed data structures may be used for anonymous page management, however, they require the programmer to be aware that the "remote" parts of those structures could be read but not written. Also, the "careful" protocol for reading remote nodes requires agreement as to the meanings of tags and consistency between two different nodes.

Consequently, Hive requires that all parts of the operating system be aware of the structure of the hardware, particularly that it is divided into domains, where data resides, and to be aware of when these different protocols must be invoked. Thus, the whole operating system has to be rewritten and extensively modified to accommodate these protocols. Moreover, the problem of using the Hive protocols is not just limited to the difficulty of initial modification, but also involves the larger issue of maintenance. Since these protocol mechanisms are distributed throughout the operating system, then the operating system is more complex and more difficult to maintain. Each programmer charged with maintenance of the operating system must know and understand how the protocols interact with the rest of the operating system.

Therefore, there is a need in the art to have a large scale computer system that uses shared memory between the different domains, and thus has good performance characteristics, as well as good reliability from using failure containment mechanisms, and yet is relatively easy to maintain, while presenting a single system image to structures above it.

SUMMARY OF THE INVENTION

These and other objects, features and technical advantages are achieved by a system and method that uses a layer of software between the operating system and the hardware that localizes the fail-safe mechanisms or protocols into a single module, and uses memory allocation functions as the interface with the operating system. This layer isolates and hides the complexities of the underlying hardware and memory sharing, and presents a simpler view of the hardware as a single system to the operating system that resides above it. Because the system uses shared memory, it has good performance characteristics.

An advantage of the invention is maintainability of the operating system. All of the complexity of managing the hardware and domains is isolated in a single module rather than distributed in the operating system. This makes it simpler to maintain, since the operating system programmers need not understand or concern themselves with the memory sharing and the reliability protocols. Moreover, since all of the reliability code is in one single module, rather than distributed throughout the operating system, it is easier to test and verify its correct operation.

Another advantage of the invention is single system image. Thus, the computer system, which may comprise many domains, appears to the operating system, as though it were just a single computer. No additional software must be layered onto the operating system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts the inventive system with the VRSM layer between the operating system and the hardware nodes; and FIG. 2 depicts a data structure allocated by the VRSM layer.

DESCRIPTION OF THE PREFERRED EMBODIMENTS

FIG. 1 depicts the inventive system 100, wherein software layer 101 is placed between hardware layer 102 and operating system layer 103. The hardware layer 102 is comprised of a plurality of nodes or domains 104. Each domain 104 has at least one processor 105 and at least one memory block 106. Each block of memory 106 is shared memory, which can be accessed by more than one domain. Each domain may also have other hardware elements that are not depicted for reasons of simplicity.

The virtually reliable shared memory (VRSM) software layer 101 provides the appearance that the hardware layer 102 is a single resource or virtual machine to the operating system 103 above the layer 101. This layer localizes the fail-safe protocols for having a particular block of shared memory 106 be accessible to the different nodes 104 of the hardware layer 102. Thus, the protocols are hidden or concealed from the operating system 103. The VRSM layer 101 allocates data structures for use by the operating system, which are shared between nodes for achieving single system image. These data structures contain critical information that needs to survive the failure of any single node and allow the system to fully recover from such a failure.

The single system image is achieved by the manner in which the VRSM layer 101 interacts with the operating system. The interface presented by the VRSM layer 101 to the operating system 103, as written in the C language appears as follows:

void*reliable_mem_alloc(int size);

void reliable_mem_dealloc(void*mem);

bool reliable_mem_lock(void*mem);

bool reliable_mem_unlock(void*mem);

The interface may also include other functions, and it may also appear differently if written in another language. Thus to the operating system 103, the VRSM layer 101 appears to be a memory allocator and memory locking module. Since, all of the data structures inside the VRSM 101 are private to that layer, then they are not accessible to the operating system 103. The only way that the operating system can interact with VRSM, is through these interface functions, which means that if the operating system 103 wants to allocate shared memory for a particular purpose, then the operating system 103 must go through this interface by calling these functions. Note that VRSM would interact with the operating system using functions, signals, and commands beyond the above listed functions.

The reliable_mem_alloc( ) function, when used by the operating system 103, causes the VRSM layer 101 to allocate a data structure of the specified size from the heap of virtually reliable memory. The heap of memory is the aggregate of the blocks of memory 106 that are in each node 104 in the hardware layer 102. This function may have additional parameters supplying information about the requested data structure, e.g. the data structure will be highly localized or widely used, and short lived or long lived. The reliable_mem_dealloc( ) function deallocates a specified data structure and returns memory to the heap of available memory for use in forming other data structures. When memory is allocated from this shared memory pool for use by the operating system, it just looks like an ordinary piece of memory, but underneath, the VRSM layer is using reliability mechanisms to ensure that the shared memory that is used for the data structure maintains its integrity. Note that the VRSM layer may assemble the data structure from shared memory entirely within one node, or it may use portions of shared memory from several nodes, depending on the intended use of the memory.

To ensure data structure and shared memory integrity, the VRSM layer would use protocols similar to those in the Hive Operating System, as detailed in the paper entitled "Hive: Fault Containment for SharedMemory Multiprocessors", by Chapin et al, Stanford University, http://www-flash.stanford.edu, the disclosure of which is incorporated herein by reference. These protocols are described as follows. One protocol is RPC or remote procedure call. If a domain needs to communicate with another domain or retrieve some information from it, instead of directly reading the other domain's memory, the calling domain, via VRSM, will send a message to the other domain requesting the information. This protocol has integrity checking of both the path to the other domain, and the return path to the calling domain. Another protocol is called the careful reference protocol. This protocol is used to allow one domain, via VRSM, to directly read some data in another domain, and is used when RPC cannot be used (because RPC may be too slow for the request, or the requested information is too large for RPC). This protocol causes the VRSM to perform various checks on the integrity of the domain and also integrity checks of the actual data to prevent either software contamination or hardware contamination of the calling domain. A further protocol involves tagged data structures. Data structures that cross domain boundaries are tagged with special code words that must be present and have certain values. If the calling domain, via VRSM, reads some data from a remote domain and the tag is incorrect, the calling domain can assume that the remote domain is insane or corrupted. A still further protocol is consistency checking. Again, this applies where one domain, via VRSM, is directly reading data from a remote domain and performs consistency checking of the data that it has read to make sure that it is correct. Another protocol is distributed data structures, which is a way of localizing data to the domain which uses it most frequently. Note that not all of these protocols would have to be used. Moreover, a disadvantage of the Hive system is that it has a wide menu of protocols for solving various problems, and as a result, the Hive system is overly complex. A system developer using VRSM is free to choose from among them as needed, and may use other protocols if necessary. Note that from a software point-of-view, the VRSM layer is operating the reliability protocols, whereas from a hardware point-of-view, the domain is operating the protocols. This is because the VRSM layer is resident in the domains.

Another fail-safe mechanism is the replication of data structures. The replicated data structure is kept separate from the domain(s) in which the original data structure is located. Thus, when a data structure is created from shared memory that contains crucial information, a copy of that information will be kept in a second, or redundant, data structure in case a domain comprising the first original data structure fails for some reason.

As shown in FIG. 2, the allocated structure 200 is larger than the size requested by the operating system, since additional hidden fields 201 are also allocated to manage the structure. The hidden fields 201 contain the size of the allocated structure, a lock field to allow software locking of the data structure, and a pointer to the replicated information for the data structure. The hidden fields 201 may contain other information. If hardware or software corruption of the data structure is a concern, additional hidden fields could be added to manage this concern. For example, a checksum could be computed and stored on operation of the unlock function and verified on operation of the lock function. Note that the hidden field need not be physically contiguous with the actual shared memory that is allocated. A replicated data structure would also contain replicated hidden fields, which would also include a pointer back to the original data structure.

When the data structure 200 is first allocated, the hidden field size is initialized to the size of the allocated memory, the hidden lock field is initialized to the "unlocked" state, additional memory is allocated, preferably on a different node(s) for holding a redundant copy of the information in the allocated memory 202, and the hidden pointer field is initialized with the location of the redundant copy.

Since multiple processors may access the shared data structure 200, a locking protocol or synchronization protocol is required so that only one processor or thread at a time can write access that memory. The reliable_mem_lock function keeps the internal source of the data structure consistent. For example, if there was more than one processor attempting to read and write the data structure at the same time, it is possible that the two processors would get confused and destroy the integrity of the data. Once the lock is acquired, a thread or processor may examine and alter the state of the data. So locking is a rollover mechanism which allows only a single processor to have access to the data structure at a time, and causes the processors to serially access it.

The reliable_mem-unlock( ) function unlocks the data structure, thereby allowing another thread of execution to access and lock it. The unlocking function also can instruct the VRSM layer to update the redundant copy of the data structure. For example, if one domain locks a data structure, changes it and then unlocks it using reliable_mem_unlock function, the unlock operation can act as a signal to the VRSM layer to update the redundant copy, if one exists, or to create a redundant copy if one does not exist. The inventive system need only maintain a single redundant copy, as the likelihood of losing two redundant copies is low, however, the system may maintain more than one redundant copy.

The locking/unlocking functions are also used for fault recovery. For example if a domain fails, and this domain contains the original copy of a particular data structure, then the remaining domains will retrieve the most update version of the duplicate data structure for their own use. Note that fault recovery is largely invisible to the operating system for a large class of faults, and the operating system continues accessing the memory as if nothing had happened. However, VRSM may signal the operating system to perform such tasks as destroying certain processes or closing certain files, depending on the type of fault. There are several different ways to implement fault recovery. In one approach, each node maintains a list of pointers to where both original and duplicate data structures are stored, and thus if a node tries to access a data structure, and determines that it is located on a failed node, it would access the redundant copy instead. Once the VRSM layer has been notified that a node has failed, either by the failed node (as a last act) or by another node that has discovered a failed node, then the VRSM layer would create a new redundant copy of the existing redundant copy, designate one of them as the new original copy, and then update the lists in each node. In another approach, each node would maintain its own redundant copy of each data structure, and would merely access this redundant structure if the original is located in a failed node. This would require a check to ensure that the copy is up-to-date, and if it is stale, then the node would retrieve the copy that is most up-to-date from a different node.

The hidden lock field must also be repaired after a node fails. This field may hold a list of blocked threads or processors in other domains that are waiting to access the failed resource that has a locked data structure. As discussed earlier, the redundant data structure also includes redundant hidden fields. Thus, the queue stored therein is consulted and the threads are re-queued on the redundant copy of the data structure. Therefore, the VRSM layer alerts the various domains which have those processors waiting on the lock to let them recover from the fault.

Other hidden lock fields will have to be repaired as well. The failed node may comprise many processors, and each of those processors dies with the domain. These dead processors may be queued up on locks for data structures that are stored in the remaining domains. Thus, each domain reviews its queues and removes the processors which belong to the failed domain.

Other repairs are made as needed. For example, if a domain is permanently down, then the VRSM layer must update its allocation tables, to remove addresses of the memory blocks of the failed domain. Thus, this shared memory will not be re-allocated.

Since the VRSM layer comprises the reliability protocols in a single module, the operating system maintenance programmers need not understand or concern themselves with the memory sharing and the reliability protocols. Moreover, since all of the reliability code is in one single module, rather than distributed throughout the operating system, it is easier to test and verify its correct operation. Furthermore, since the protocols used to implement reliability are hidden from and transparent to the user, the system incorporating the VRSM layer presents a simpler model from which to design and operate programs.

Although the present invention and its advantages have been described in detail, it should be understood that various changes, substitutions and alterations can be made herein without departing from the spirit and scope of the invention as defined by the appended claims.

What is claimed is:

1. A computer system comprising:
   a plurality of nodes, wherein each node includes at least one processor and at least one shared memory;
   an operating system for managing the computer system; and
   an interface module, connected between the operating system and the plurality of nodes, for facilitating the operating system to treat the plurality of nodes as if the plurality of nodes are a single resource, and for segregating the plurality of nodes to prevent fault propagation between the plurality of nodes, wherein the interface module includes a plurality of reliability protocols for preventing a failure in one node of the plurality of nodes from spreading to the remaining nodes of the plurality of nodes;
   wherein one node requires information stored in another node, and the plurality of reliability protocols comprises:
   a remote call protocol that causes the interface module to generate a request message for the information that is sent to said another node, on behalf of the one node;
   a careful reference protocol that causes the interface module to inspect the integrity of said another node and the information before directly accessing the information on behalf of the one node; and
   a consistency checking protocol that causes the interface module to perform consistency checking on the information after directly accessing the information;
   wherein the interface module interfaces with the operating system via a memory allocation function and a memory deallocation function, and treats all of the shared memory as a heap of shared memory, such that an invocation of the memory allocation function by the Operating system causes the interface module to allocate a portion of the heap to form a data structure, a pointer to which is returned to the operating system.

2. The computer system of claim 1, wherein:
the failure is a software failure.

3. The computer system of claim 1, wherein:
the failure is a hardware failure.

4. The computer system of claim 1, wherein:
an invocation of the memory deallocation function by the operating system causes the interface module to deallocate the portion of the heap used to form the data structure.

5. The computer system of claim 1, wherein:
the size of the data structure is larger than a size requested by the operating system.

6. The computer system of claim 1, wherein:
the data structure includes at least one hidden field which contains information about the data structure.

7. The computer system of claim 6, wherein there are at least two hidden fields, and the information in the hidden fields comprises:
a lock field to allow software locking of the data structure; and
a pointer field pointing to a redundant data structure.

8. The computer system of claim 6, wherein there are at least two hidden fields, and the information in the hidden field comprises:
a size field indicating a size of the allocated memory; and
a check sum field for indicating corruption of the data structure.

9. The computer system of claim 1, wherein;
the invocation of the memory allocation function causes the interface module to create a redundant data structure, which is a copy of the data structure; and
the redundant data structure is stored in shared memory that is in a node different fron that which the data structure is stored.

10. The computer system of claim 1, wherein the interface module interfaces with the operating system via a memory locking function and a memory unlocking function, and wherein;
an invocation of the memory locking system locks access to the data structure to only the one process of a particular node of the plurality of nodes and prevents acess by any other process in the computer system.

11. The computer system of claim 10, wherein:
an invocation of the memory unlocking function by the operating system unlocks access to the locked data structure, thereby allowing another processor to access the data structure.

12. The computer system of claim 11, the invocation of the memory allocation function causes the interface module to create a redundant data structure, which is a copy of the data structure, and wherein:
the invocation of the memory unlocking function signals the interface module to update the redundant data structure.

13. A computer program product having a computer readable medium having computer program logic recorded thereon that facilitates an operating system to treat a plurality of nodes in a computer system, as if the plurality of nodes are a single resource, wherein each node of the plurality of nodes includes at least one processor and at least one shared memory, the computer program product comprising:
a plurality of reliability protocols for preventing a failure in one node of the plurality of nodes from spreading to the remaining nodes of the plurality of nodes;
a memory allocation function which is invoked by the operating system to cause the interface module to allocate a portion of the shared memory to form a data structure, a pointer to which is returned to the operating system;
a memory deallocation function which is invoked by the operating system to cause the interface module to deallocate the portion of the shared memory used to form the data structure;
a memory locking function which is invoked by the operating system to lock access to the data structure to only the one processor of a particular node of the plurality on nodes, and prevent access by any other processor in the computer system; and
a memory unlocking function which is invoked by the operating system to unlock access to a locked data structure, and grant access to another processor in the computer system;
wherein one node requires information stored in another node, and the plurality of reliability protocols includes:
a remote call protocol that causes the interface module to generate a request message, for the information that is sent to said another node, on behalf of the one node;
a careful reference protocol that causes the interface module to inspect the integrity of said another node and the information before directly accessing the information on behalf of the one node; and
a consistency checking protocol that causes the interface module to perform consistency checking on the information after directly accessing the information.

14. The computer program product of claim 13, wherein:
the failure is a software failure.

15. The computer program product of claim 13, wherein:
the failure is a hardware failure.

16. The computer program product of claim 13, wherein:
the size of the data structure is larger than a size requested by the operating system.

17. The computer program product of claim 13, wherein:
the data structure includes at least one hidden field, which contains information about the data structure.

18. The computer program product of claim 17, wherein there are at least two hidden fields, and the information in the hidden fields comprises:
a lock field to allow software locking of the data structure; and
a pointer field pointing to a redundant data structure.

19. The computer program product of claim 17, wherein there are at least two hidden fields, and the information in the hidden fields comprises:
a size field indicating a size of the allocated memory; and
a check sum field for indicating corruption of the data structure.

20. The computer program product of claim 13, wherein:
the invocation of the memory allocation function causes the interface module to create a redundant data structure which is a copy of the data structure; and
the redundant data structure is stored in shared memory that is in a node different from that in which the data structure is stored.

21. The computer program product of claim 20, wherein:
the invocation of the memory unlocking function signals the interface module to update the redundant data structure.

22. A method for providing an operating system of a computer system with a virtual resource, the computer system comprising a plurality of nodes, with each node including at least one processor and at least one shared memory, the method comprising the steps of:
managing the computer system under the control of the operating system;
segregating the plurality of nodes to prevent fault propagation between the plurality of nodes; and facilitating the operating system to treat the plurality of nodes as if the plurality of nodes are a single resource;

wherein the step of segregating and the step of facilitating are performed via an interface module that is inserted between the operating system and the plurality of nodes;

wherein the step of segregating comprises the step of preventing a failure in one node of the plurality of nodes from spreading to the remaining nodes of the plurality of nodes;

wherein one node requires information stored in another node, and the step of preventing a failure comprises the steps of:

generating by the interface module on behalf of the one node, a request message for the information that is sent to said another node;

inspecting, by the interface module on behalf of the one node the integrity of said another node and the information, before directly accessing the information; and performing, by the interface module, consistency checking on the information after directly accessing the information;

wherein the step of facilitating comprises the step of interfacing by the interface module, with the operating system via a memory allocation function and a memory deallocation function; and wherein the interface module treats all of the shared memory as a heap of shared memory, and the step of interfacing comprises the steps of:

invoking, by the operating system, the memory allocation function;

allocating, by the interface module, a portion of the heap to form a data structure; and returning, to the operating system, a pointer to the data structure.

23. The method of claim 22, wherein:

the failure is a software failure.

24. The method of claim 22, wherein:

the failure is a hardware failure.

25. The method of claim 22, wherein the step of facilitating further comprises the steps of:

invoking, by the operating system, the memory deallocation function; and deallocating, by the interface module, the portion of the heap used to form the data structure.

26. The method of claim 22, wherein:

the size of the data structure is larger than a size requested by the operating system.

27. The method of claim 22, wherein:

the data structure includes at least one hidden field which contains information about the data structure.

28. The method of claim 27, wherein there are at least two hidden fields, the information in the hidden fields comprises:

a lock field to allow software locking of the data structure; and a pointer field pointing to a redundant data structure.

29. The method of claim 27, wherein there are at least two hidden fields, the information in the hidden fields comprises:

a size field indicating a size of the allocated memory; and a check sum field for indicating corruption of the data structure.

30. The method of claim 22, wherein the step of invoking comprises the steps of:

creating a redundant data structure which is a copy of the data structure; and storing the redundant data structure in shared memory that is in a node different from that which the data structure is stored.

31. The method of claim 22, wherein the step of facilitating comprises the steps of:

interfacing, by the interface module, with the operating system via a memory locking function and a memory unlocking function;

invoking the memory locking fiction, by the operating system;

granting access to the data structure to only the one processor of a particular node of the plurality on nodes; and preventing access to the data structure by any other processor in the computer system.

32. The method of claim 31, wherein the step of facilitating further comprises the steps of:

invoking the memory unlocking function by the operating system; and granting access to the locked data structure to another processor in the computer system.

33. The method of claim 32, wherein the step of invoking the memory allocation function causes the interface module to create a redundant data structure, which is a copy of the data structure, and wherein the step of invoking the memory unlocking function comprises the step of:

signaling the interface module to update the redundant data structure.

* * * * *